US012350677B2

(12) United States Patent
Johns et al.

(10) Patent No.: US 12,350,677 B2
(45) Date of Patent: Jul. 8, 2025

(54) DEVICE FOR LOADING PELLETS INTO REACTOR TUBES

(71) Applicant: Tubemaster, Inc., Louisville, KY (US)

(72) Inventors: Clifford L. Johns, Louisville, KY (US); Dennis Patrick McAndrews, Jeffersonville, IN (US); Paul D. Gossen, Louisville, KY (US); Christopher G. Johns, Louisville, KY (US)

(73) Assignee: Tubemaster, Inc., Louisville, KY (US)

( * ) Notice: Subject to any disclaimer, the term of this patent is extended or adjusted under 35 U.S.C. 154(b) by 485 days.

(21) Appl. No.: 17/820,561

(22) Filed: Aug. 17, 2022

(65) Prior Publication Data

US 2023/0112170 A1    Apr. 13, 2023

Related U.S. Application Data

(60) Provisional application No. 63/233,827, filed on Aug. 17, 2021.

(51) Int. Cl.
*B01L 3/00* (2006.01)
*B01J 19/32* (2006.01)

(52) U.S. Cl.
CPC ............... *B01L 3/52* (2013.01); *B01J 19/32* (2013.01); *B01J 2219/3086* (2013.01); *B01L 2200/02* (2013.01); *B01L 2300/0832* (2013.01)

(58) Field of Classification Search
CPC .............. B01L 3/52; B01L 2200/02; B01L 2300/0832; B01J 19/32; B01J 2219/3086; B01J 19/2425; B01J 2204/002; B01J 2208/0061; B01J 2208/00752; B01J 2208/00778; B01J 2219/308; B01J 3/00; B01J 4/008; B01J 8/002; B01J 8/0025; B01J 8/003; B01J 8/004; B01J 8/06
USPC .......................................... 141/237
See application file for complete search history.

(56) References Cited

U.S. PATENT DOCUMENTS

| | | | |
|---|---|---|---|
| 3,913,806 A * | 10/1975 | Red, Jr. .................. | B01J 8/06 222/429 |
| 5,897,282 A | 4/1999 | Comardo | |
| 11,590,471 B2 | 2/2023 | Johns | |
| 2005/0220685 A1 | 10/2005 | Harper et al. | |
| 2011/0083769 A1 | 4/2011 | Sanz et al. | |
| 2011/0277421 A1 | 11/2011 | Te et al. | |
| 2011/0283666 A1 * | 11/2011 | Johns .................. | B01J 8/002 53/473 |
| 2015/0114516 A1 | 4/2015 | Knubben et al. | |
| 2016/0220974 A1 * | 8/2016 | Schmidt ................ | B01J 8/06 |

* cited by examiner

*Primary Examiner* — Craig M Schneider
*Assistant Examiner* — Christopher M Afful
(74) *Attorney, Agent, or Firm* — Duncan Galloway Greenwald PLLC; Kevin T. Duncan

(57) ABSTRACT

A loading device for loading pellets into reactor tubes has a modular design, which can be taken apart, moved through a manway, and then reassembled simply by stacking one part on top of another. A reciprocating slide plate and a vibrator work together to meter pellets through the loading device and into the reactor tubes.

8 Claims, 11 Drawing Sheets

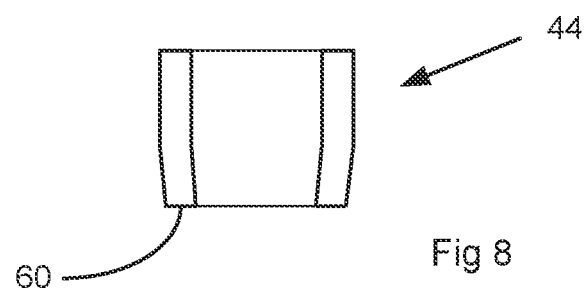
Fig 8
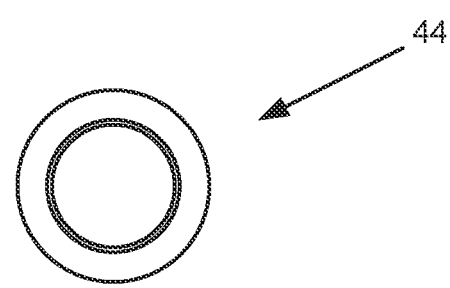
Fig 9
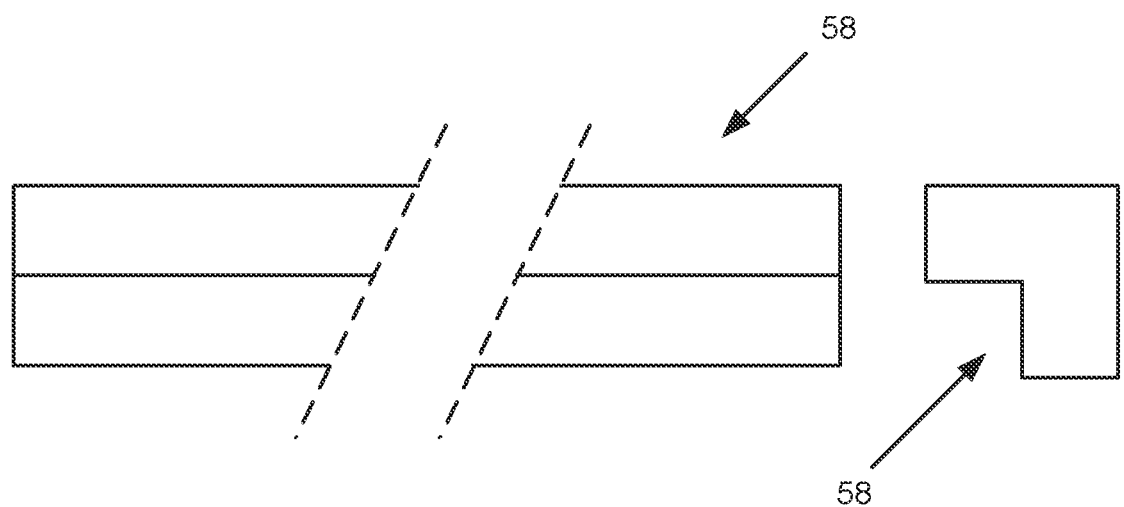
Fig 10
Fig 11

DEVICE FOR LOADING PELLETS INTO REACTOR TUBES

CROSS-REFERENCE AND INCORPORATION BY REFERENCE

This application claims benefit of priority from U.S. Ser. No. 63/233,827, filed Aug. 17, 2021, which is hereby incorporated herein by reference.

BACKGROUND

The present invention relates to an arrangement for loading pellets into the tubes of a chemical reactor.

Many chemical reactors are essentially large shell and tube heat exchanger vessels, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with from 10 to 5,000 or more such tubes. In any of these reactor vessels, catalyst pellets may be loaded into the reactor to facilitate the reaction. Inert pellets also may be loaded into the reactor tubes to certain levels. Often, a layer of inert pellets is loaded at the bottom portion and top portion of each tube, with catalyst pellets extending for the major portion of the tube, between the inert layers. The pellets are replaced periodically.

The reactor tubes may be quite long, housed in a structure several stories tall. In order to replace the pellets, the old pellets first are removed from the reactor tubes. The inside surface of each tube is then cleaned to remove any scale formed during the chemical reaction process, as this scale impedes or retards the reaction by slowing down the heat transfer rate.

As the pellets are loaded back into the reactor tubes, it is desirable to load specific types of pellets to certain desired levels in each tube.

SUMMARY

The present invention relates to an arrangement for loading pellets in one or more tubes in a reactor vessel and loading those pellets to a desired level. The present invention allows the user to measure a certain volume of each type of pellets before loading them into the reactor tube in order to result in the desired type of pellets filling the tube to the desired level.

In one of the described embodiments, two or more tubes may be filled simultaneously to a desired level by loading a pre-determined volume of pellets into each hopper of a charging cassette.

A reciprocating plate moves openings back and forth under the charging cassette to "meter" out the pellets, which flow down flexible conduits that feed the pellets into the tubes to be loaded. The reciprocating plate controls the rate at which pellets flow into the flexible conduits and helps prevent and break up bridging of the pellets. In addition, an eccentric mass vibrates the charging cassette to help break up any bridging that may form despite the reciprocating motion of the bottom plate. The eccentric mass vibrates at an adjustable frequency, and the reciprocating plate operates at an adjustable frequency. The two frequencies interact with each other to generate a beat frequency which aids in the breaking any bridging of the pellets.

BRIEF DESCRIPTION OF THE DRAWINGS

FIG. 8 is a side section view of the funnel of FIG. 3;

FIG. 9 is a plan view of the funnel of FIG. 8;

FIG. 10 is a broken away, side view of one of the guide rails shown in FIG. 4;

FIG. 11 is an end view of the guide rail of FIG. 10;

DESCRIPTION

Figure 1:
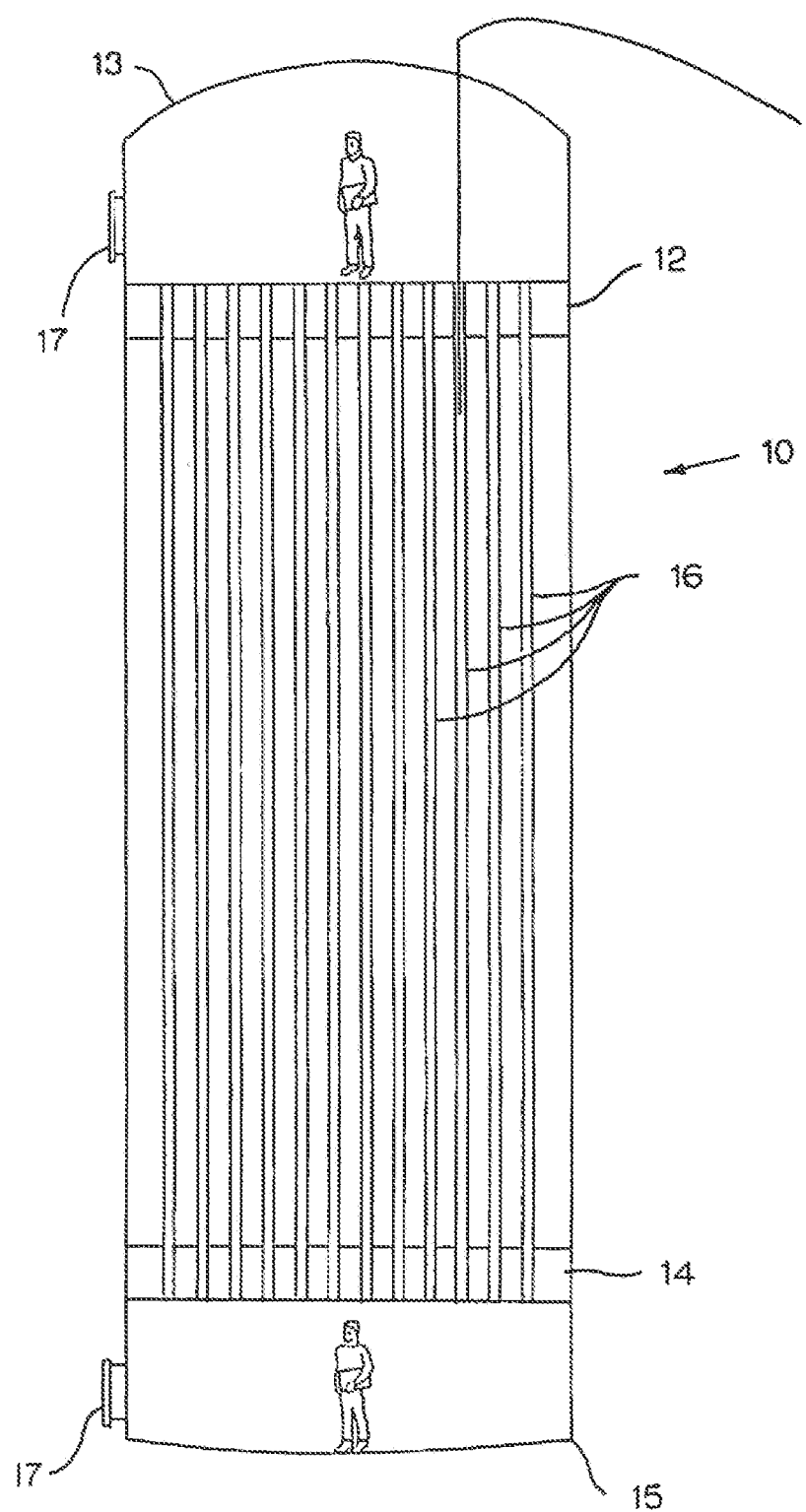
FIG. 1 is a schematic, section view of a shell and tube type of chemical reactor vessel.
Figure 2:
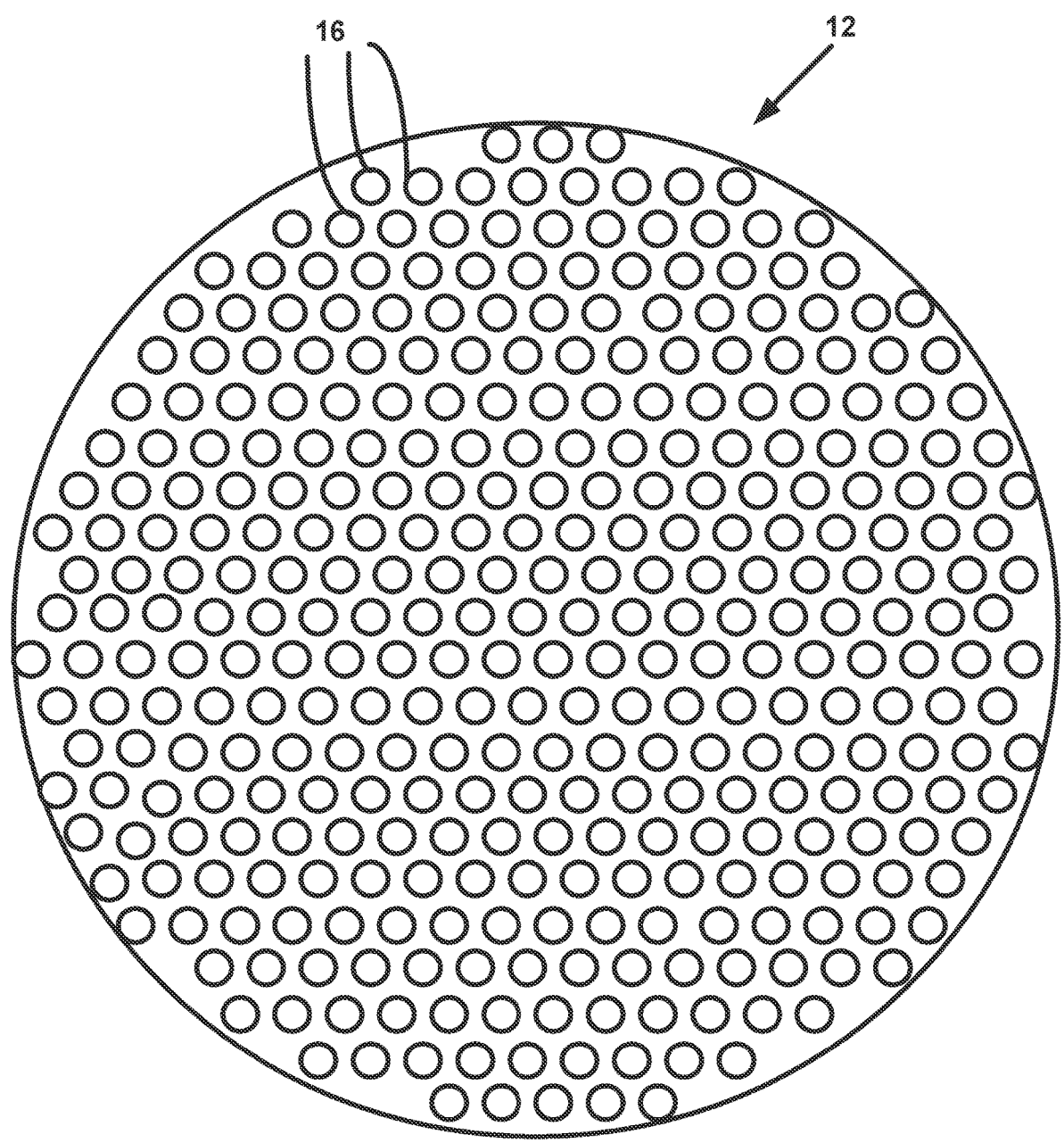
FIG. 2 is a schematic plan view of the upper tubesheet of the reactor vessel of FIG. 1, which is the same as the bottom tubesheet.

FIG. 1 depicts a typical chemical reactor vessel 10, which is a shell and tube heat exchanger, having an upper or top tubesheet 12 and a lower or bottom tubesheet 14, with a plurality of vertical reactor tubes 16 welded or expanded to the tubesheets 12, 14 to form a tightly packed tube bundle. There may be from one to many hundreds or even thousands of cylindrical reactor tubes 16 (See also FIG. 2) extending between the tubesheets 12, 14. Each reactor tube 16 has a top end 13 secured to the upper tubesheet 12 and a bottom end 15 secured to the lower tubesheet 14, and the reactor tubes 16 are open at both ends, except that there usually is a spring, clip or grid (not shown) at the bottom end of each reactor tube 16 to retain pellets inside the reactor tube 16. The upper and lower tubesheets 12, 14 have openings that are the size of the outside diameter of the reactor tubes 16, with each reactor tube 16 being located in respective aligned openings in the upper and lower tubesheets 12, 14.

The reactor vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling and tube cleaning operations. The reactor tubes 16 are filled with pellets. The pellets may include various layers of inert pellets and catalyst pellets, as desired. In many cases, the major portion of the reactor tube is filled with a tall layer of catalyst pellets, with a short layer of inert pellets above and below the catalyst pellets. The catalyst pellets facilitate the chemical reaction. (It may be noted that similarly-shaped shell and tube heat exchangers may be used for other purposes, such as for a boiler or other heat exchanger.)

Reactors have either fixed or removable heads. In this embodiment, the heads are fixed, and they include manways 17 at the top and at the bottom in order to provide access to their respective domes.

This particular reactor vessel 10 is fairly typical. Its tubes can range in length from 5 feet to 65 feet, and it is surrounded by a structural steel skid or framework (not shown), which includes stairways or elevators for access to the tubesheet levels of the reactor vessel 10 as well as access to intermediate levels, to a topmost level which may be located at or near the level of the top opening of the reactor vessel 10, and to a lower level which may be located at or near the level of the lower dome 15 of the reactor vessel 10. On a regular basis, which can be every 2 to 48 months or longer, as the catalyst becomes less efficient, less productive, or "poisoned", the pellets are changed out, with the old pellets being removed and new pellets being installed in the reactor tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons.

Part of the catalyst change operation involves cleaning out the inside surface of the reactor tubes 16 to remove any scale that may have formed inside the reactor tubes 16. The scale inhibits the heat transfer across the wall of the reactor tubes 16 and therefore should be removed prior to reloading catalyst pellets inside the reactor tubes 16.

Once the reactor tubes 16 have been cleaned, they are loaded with new pellets. Typically, the bottom portion of all the reactor tubes 16, adjacent the lower tubesheet 14, is loaded with inert pellets. Then, one or more layers of catalyst pellets is loaded to desired levels. Then, a final layer of inert pellets is loaded into the reactor tube 16 adjacent the upper tubesheet 12. Each layer of pellets is loaded to a specific, desired elevation or level within the reactor tube 16.

Figure 3:
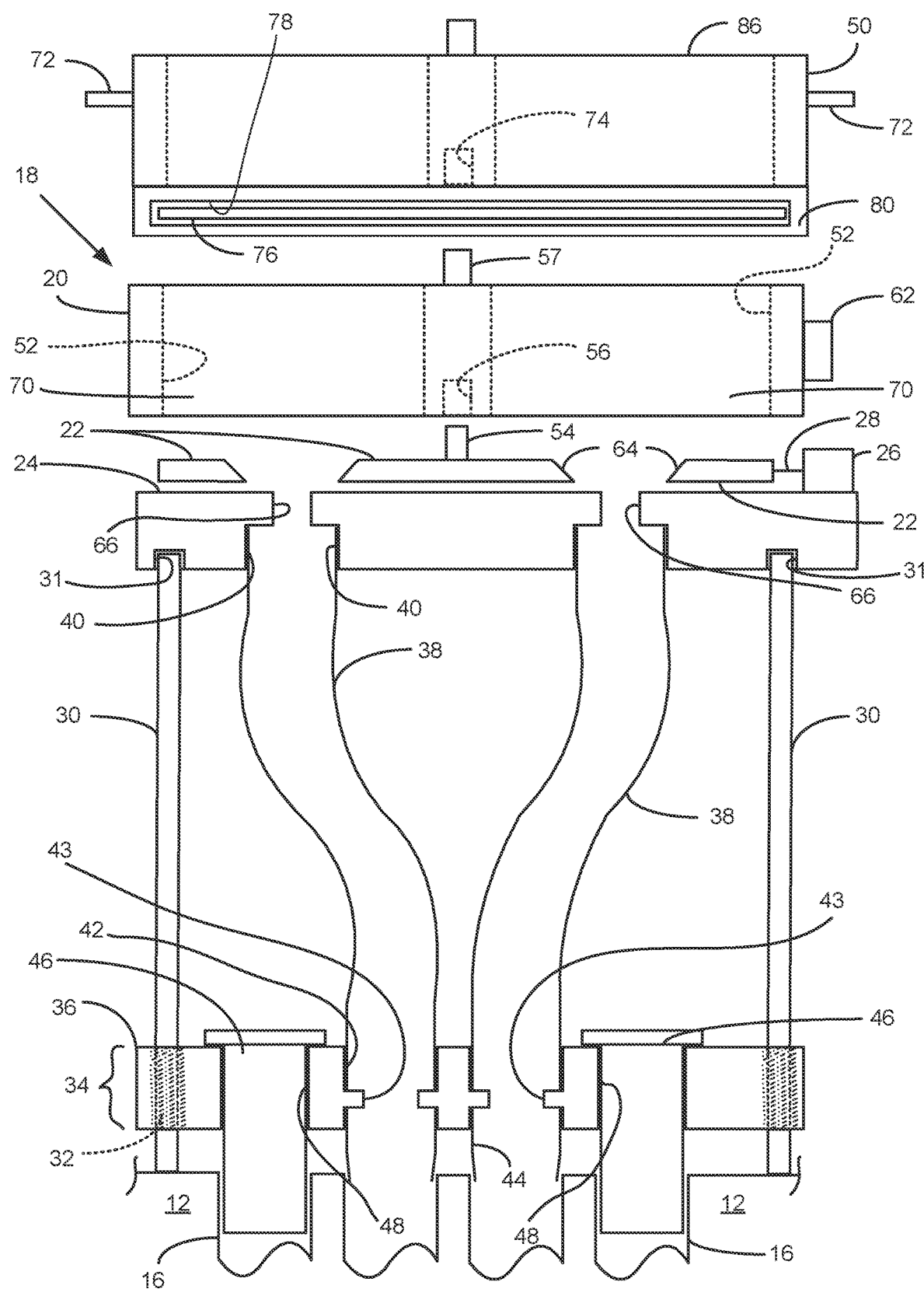
FIG. 3 is a partially exploded, schematic side view of a loading device for loading pellets into the tubes of the chemical reactor vessel, showing a broken-away portion of the top tubesheet of FIG. 2.
Figure 4:
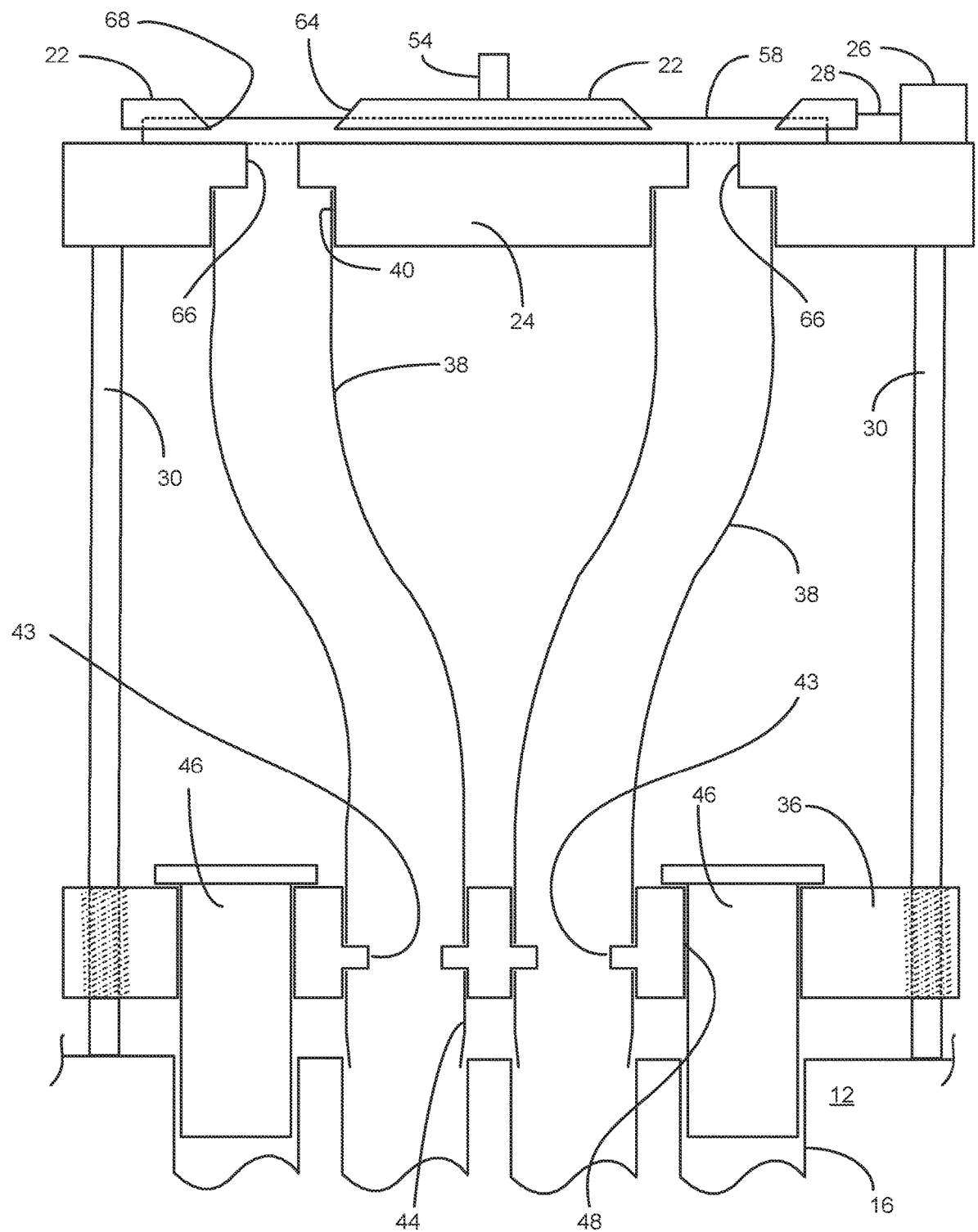
FIG. 4 is a detailed side view of the lower portion of the loading device of FIG. 3.

FIGS. 3 and 4 show an embodiment of a loading device 18 made in accordance with the present invention. The loading device 18 includes a top plate 24 (at a third elevation) and a bottom plate 36 (at a second elevation), which are supported atop the upper tubesheet 12 (at a first elevation) by vertical rods 30 and threaded journals 32 provided in bottom plate 36, which serve as spacers to space and support the top and bottom plates. The rods 30 includes a threaded portions located to be received in threaded fashion in threaded journals 32. By having this threaded interface, the spacing or distance or elevation of bottom plate 36 relative to the upper or top tubesheet 12 may be adjusted within a range of positions or elevations. Each top plate 24 has a plurality of openings 66, and each bottom plate 36 has a corresponding plurality of openings 43. The top plate 24 simply rests on top of the rods 30, with the rods 30 being inserted into recesses 31 in the bottom surface of the top plate 24. The height of the bottom plate 36 is adjustable relative to the rods 30, as explained later. The openings 43 in the bottom plate 36 are aligned with the reactor tubes 16.

A reciprocating plate 22 is mounted on top of the top plate 24. An easily removable charging cassette 20 rests atop the reciprocating plate 22 and moves with the reciprocating plate 22.

Conduits or tubes or a plurality of conduits/tubes 38, which preferably are made of a flexible material, such as plastic tubing or hose, extend from the top plate 24 to the bottom plate 36 and are aligned with the respective openings 66, 43 in the top and bottom plates. For each conduit or tube 38, there is a recess 40 on the bottom surface of the top plate 24, and a respective recess 42 on the top surface of the bottom plate 36. Each conduit or tube 38 is inserted into its respective recess 40 in the top plate 24 and its respective recess 42 in the bottom plate 36 to provide a path from the top plate 24 to the bottom plate 36, so that any pellets (not shown) metered or dispersed or distributed from the charging cassette 20 fall through an opening 66 in the top plate and pass through a respective conduit 38, through an opening 43 in the bottom plate 36, and into a respective reactor tube 16. It should be noted that, while flexible conduits are preferred, the conduits 38 may be rigid or semi-rigid instead.

The reciprocating plate 22 sits flat on the top plate 24 and is moved back and forth, circularly, orbitally, or otherwise across or along the top plate 24 by a speed-adjustable, low speed, reciprocating actuator 26 that vibrates or otherwise moves so as to present catalyst pellets to openings for loading into a reactor tube. Actuator 26 is connected to the reciprocating plate 22 via a rod 28. The reciprocating plate 22 is guided in its back and forth, horizontal motion by a set of tracks 58 (shown in FIGS. 4, 6, 10, and 11), which are secured to the top plate 24.

It should be noted that the bottom plate 36 preferably is located and supported at a second elevation a distance above the tubesheet 12 at a first elevation relative to the reactor by the threaded rods 30 and threaded journals 32 (as described above) so that any rough or uneven areas on the tubesheet 12 do not interfere with the operation of the loading device 18. Ideally, the height of the bottom plate 36 (at the second elevation) above the tubesheet 12 (at the first elevation) remains the same for the majority of the reactors on which the loading device 18 is intended to be used, providing generally about one half to two inches of clearance between the bottom plate 36 and the tubesheet 12. However, if a particular reactor requires more (or less) than this typical clearance, the height of the bottom plate 36 above the tubesheet 12 may be adjusted easily, by rotating the rods 32, which are threaded into the bottom plate (in essence raising or lowering the second elevation relative to the first elevation). The flexible conduits 38 accommodate the change in elevation of the bottom plate 36. The bottom plate openings 43 may be positioned directly opposite respective tube sheet openings and reactor tubes 16 by means of locating or positing pins or guids 46 as described below. Optionally, a funnel-like extension or extension tube 44 (See also FIGS. 8 and 9) is inserted into a recess in the bottom surface of the bottom plate 36, aligned with the respective opening 43, and extends from the bottom plate 36 into the reactor tube 16.

The maximum required elevation of the bottom plate 36 above the tubesheet 12 for a particular reactor may be determined by inspecting the condition of the tubesheet 12.

An extension 44 of adequate length is selected to ensure that the distance from the bottom plate 36 to the tube 16 will be bridged by the extension 44. Again, a typical extension 44 length will likely work for the vast majority of the reactors to be loaded. It also should be understood that, for some applications, the bottom plate 36 may rest directly on top of the tubesheet 12 or very close in proximity thereto, in which case an extension 44 may not be used.

It should be noted that the outside diameter of the top end of the extension 44 is larger than the inside diameter of the reactor tube 16, and the slightly converging bottom end 60 of the extension 44 (See FIG. 8) has a smaller diameter, which does fit inside the reactor tube 16. This ensures that the extensions 44 will not fall into the tubes 16 should they come loose from the bottom plate 36, and ensures that the pellets are transported through the gap between the bottom plate 36 and the tubesheet 12 and into the respective tube 16.

The flexible conduit configuration allows two (or more) reactor tubes 16, especially adjacent tubes 16, as shown in FIG. 3, to be loaded while using relatively large charging cassettes 20. So, for example, a loading device 18 designed to simultaneously load 24 tubes may have a footprint that is considerably larger than the surface area of the tubesheet 12 containing those 24 tubes.

Figure 7:
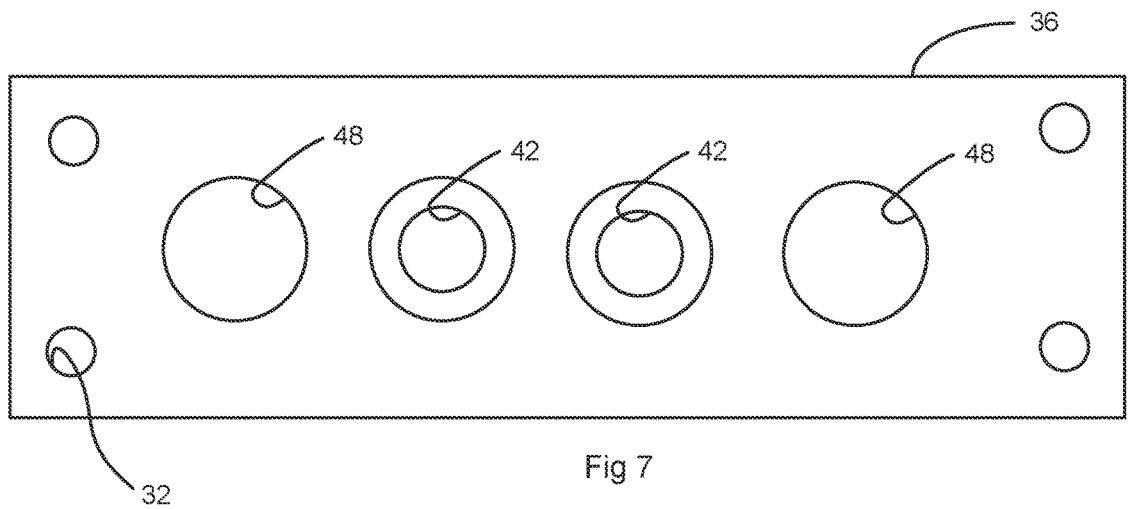
FIG. 7 is a plan view of the bottom plate of the loading device of FIG. 3.

In order to properly locate the loading device 18 relative to the reactor tubes 16 to be loaded, locating pins 46 extend through openings 48 in the bottom plate 36 and into tubes 16 near the tubes 16 to be loaded. (See FIGS. 3, 4, and 7.) In actual practice, the bottom plate 36 of the loading device 18 is designed and fabricated for a specific tubesheet 12 in a reactor. That is, the location and spacing of the openings 43 for the conduits 38, as well as the location and spacing of the openings 48 for the locating pins 46 match up to the reactor tubes 16 on a specific reactor. As explained below, substantially the same loading device 18 may be used even if the length of the tubes 16 is different by adjusting or replacing the charging cassettes 20 or the volumizing cassettes 50, as needed. A vacuum attachment with a mesh screen (not shown) to collect and remove only dust may be added to the side of the charging cassette 20 and the volumizing cassette 50 and even along the length of conduits 28.

The Charging Cassette:

Referring to FIG. 3, the charging cassette 20 defines a plurality of identically-sized compartments 52 which are open at the top and at the bottom. Each compartment is designed to hold a "charge" (or volume) of pellets. This charge or volume is designed to hold enough pellets to load a tube 16 to the desired level. While the footprint of different charging cassettes 20 designed to load different volumes of pellets preferably would remain the same to be able to use them in any standard-sized loading device 18, the height could be changed to accommodate larger charges.

Figure 5:
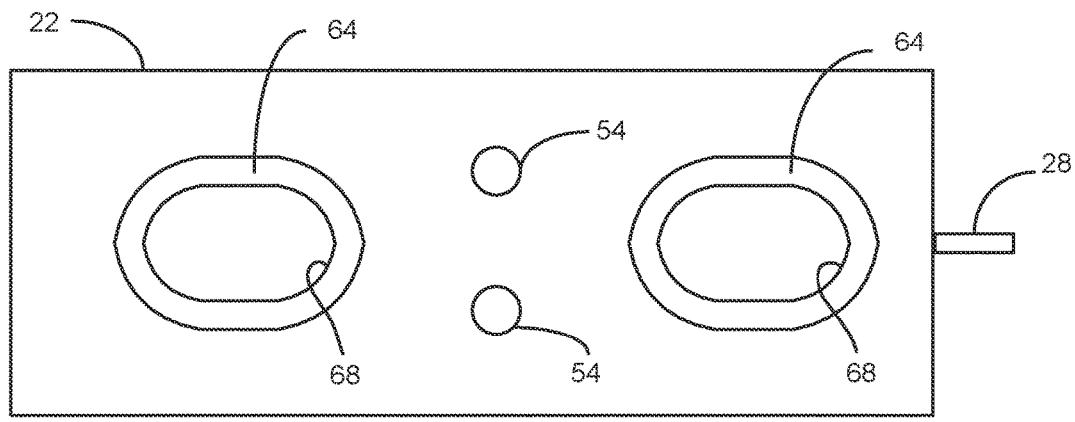
FIG. 5 is a plan view of the reciprocating plate of the loading device of FIG. 3.
Figure 6:
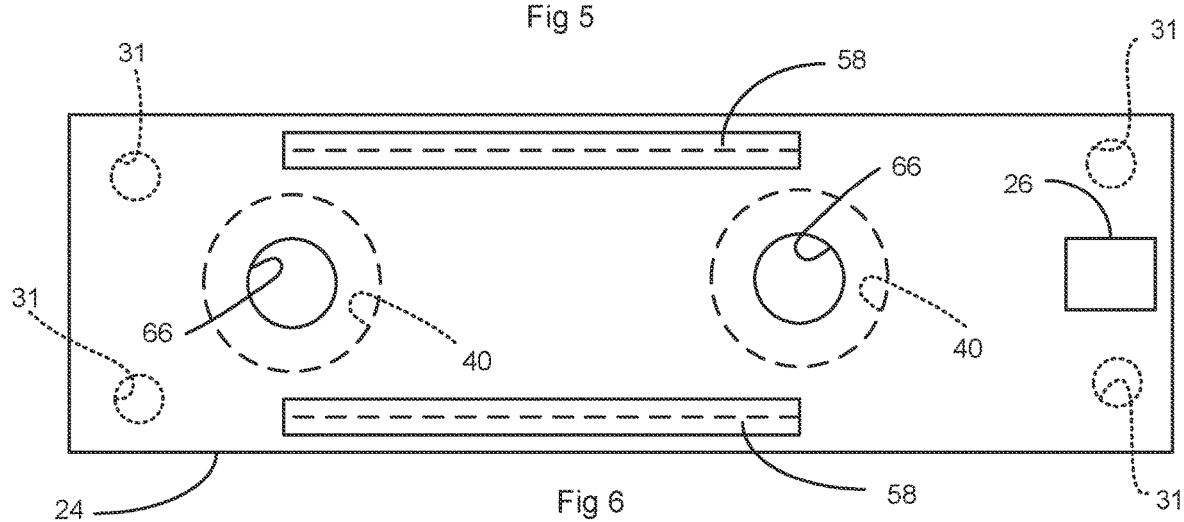
FIG. 6 is a plan view of the top plate of the loading device of FIG. 3.

The charging cassette 20 rests atop, and moves with, the reciprocating plate 22 onto which it is mounted, so the reciprocating plate 22 essentially becomes the floor of the charging cassette 20 once the charging cassette 20 is installed on the reciprocating plate 22. As shown in FIGS. 3, 4, and 5, pins 54 projecting upwardly on the top surface of the reciprocating plate 22 are received in mating cavities 56 in the bottom surface of the charging cassette 20, and the bottom surface of the charging cassette 20 rests on the top surface of the reciprocating plate 22, which keeps the charging cassette 20 in place on the reciprocating plate. When the actuator 26 extends and retracts the rod 28, which slides the reciprocating plate 22 back and forth across the top of the top plate 24, it also carries the charging cassette 20 with the reciprocating plate in that same reciprocating motion.

A vibrating eccentric mass 62 is attached to the charging cassette 20 or other locations to disturb bridged particles such as catalyst, encouraging them to flow with minimal energy put into the particles. The actuator 26 connected to the reciprocating plate 22 typically operates at a relatively low frequency, preferably in the range of 30 to 50 cycles per minute. The eccentric mass 62, mounted to the charging cassette 20, typically operates at a higher frequency, preferably in the range of 50 to 60 cycles per second.

Figure 20:
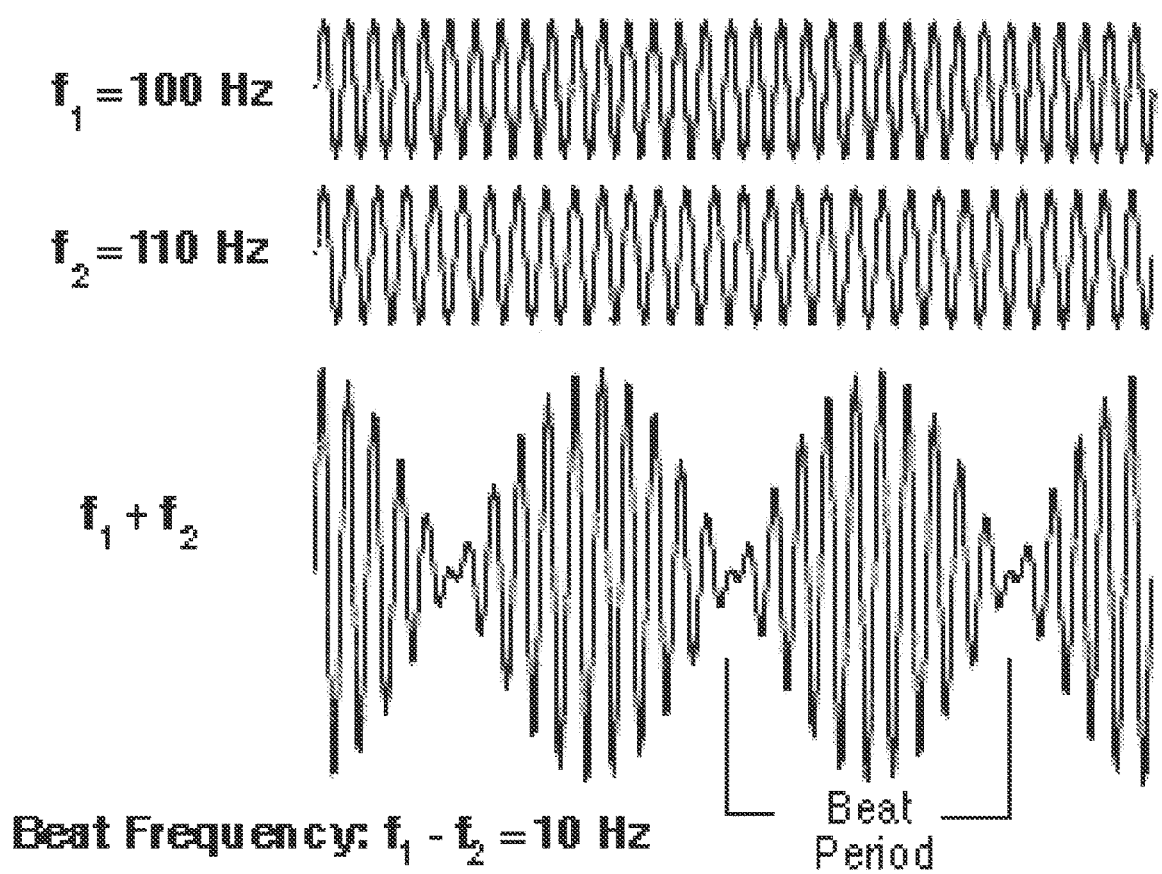
FIG. 20 is a schematic explaining the concept of a beat frequency (or beat period).

As shown in FIG. 20, when two different frequencies are combined (i.e. the frequency of the actuator 26 and the frequency of the vibrating eccentric mass 62), they generate a beat frequency. In a preferred embodiment, the frequencies are selected so that the beat frequency is approximately one beat per second. That is, approximately once every second, the frequencies of the reciprocating plate 22 and of the eccentric mass 62 coincide to a maximum displacement (or peak), to provide an added "jolt" to the charge of pellets. This serves to knock down the pellets which may be bridged or stuck in the charging cassette 20, so they can flow down, through the openings 64 in the reciprocating plate 22. It should be noted that the vibrating eccentric mass 62 alternatively may be attached to other components of the loading device 18, such as the top plate 24.

FIGS. 3-5 show the pins 54 on the reciprocating plate 22 and show a plurality of ovoid-shaped, beveled-edged openings 64 in the reciprocating plate 22 (one opening 64 for each chamber 52 of the charging cassette 20). As the reciprocating plate moves back and forth across the top plate 24, the openings 64 of the reciprocating plate move into and out of alignment with the openings 66 in the top plate 24, thereby metering the pellets in the charging cassette 20 into the conduits 38 leading to the tubes 16. This careful metering controls the rate of flow of the pellets, keeping the flow at a low enough rate to prevent bridging of the pellets in the conduits 38 and in the reactor tubes 16. Any bridging that may occur in the charging cassette 20 is broken up by the vibrations from the vibrator 62 and by the beats that occur as explained above.

Figure 12:
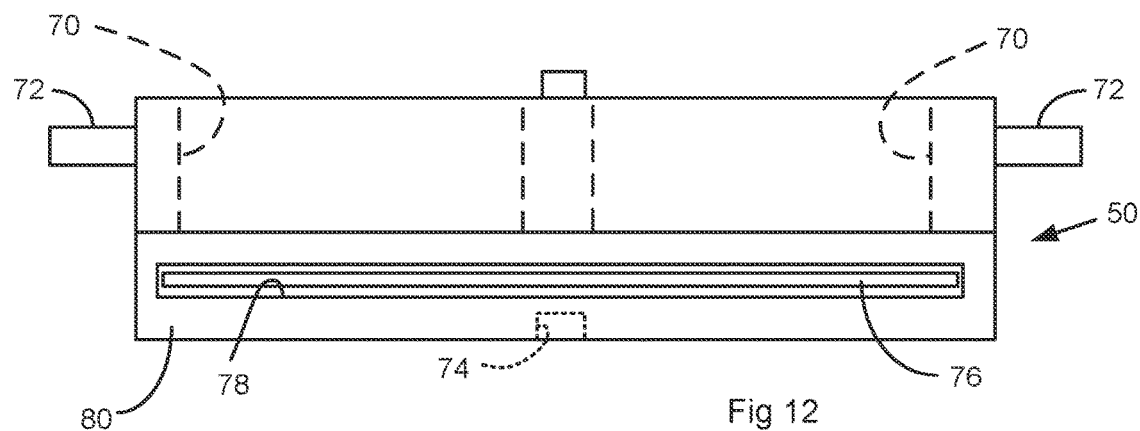
FIG. 12 is a side view of the volumizing cassette shown in FIG. 3.
Figure 13:
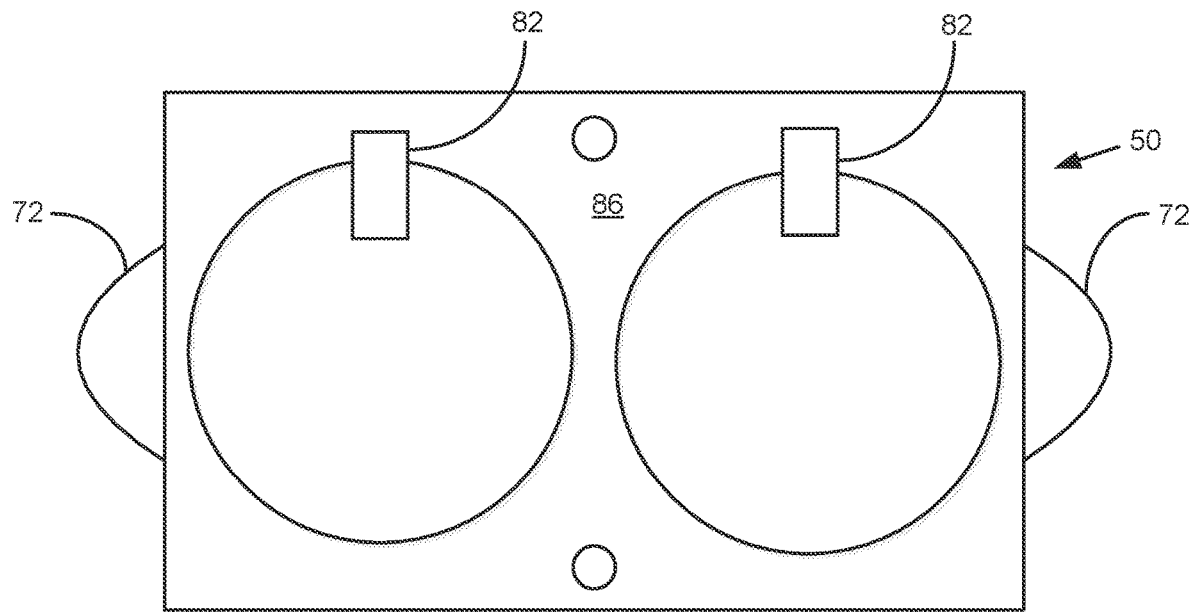
FIG. 13 is a plan view of the volumizing cassette of FIG. 12.

FIGS. 12 and 13 show a volumizing cassette 50, which is used to load measured volumes of pellets into the compartments 52 of the charging cassette 20. The volumizing cassette 50 is similar to the charging cassette 20 in that it defines a plurality of open-top and open-bottom hoppers 70, which line up substantially with the corresponding compartments 52 in the charging cassette 20. The volumizing hoppers 70 are sized to hold an accurate charge or volume of pellets. A knife gate 76 at the bottom of the volumizing cassette 50 closes off the bottoms of the hoppers 70 until it is time to release the pellets from the volumizing cassette 50 into the charging cassette 20. The volumizing cassette 50 includes handles 72.

The volumizing cassette 50 typically is filled with pellets outside the reactor vessel 10 when the knife gate 76 is closed, and the handles 72 are used to carry it into the vessel 10 and place it atop the charging cassette 20 of the pellet loading device 18, as shown in FIG. 3. The bottom surface of the volumizing cassette 50 defines cavities 74 which receive upwardly-projecting pins 57 (See FIG. 3) on the top surface of the charging cassette 20. The main purpose of these cavities 74 is to help align the volumizing cassette 50 with the charging cassette 20 so that the pellets in the hoppers 70 will drop directly into their corresponding compartments 52 in the charging cassette 20 when the knife gate 76 (See also FIG. 15) is slid out by the operator, as described below.

It should be noted that the volumizing cassette 50 has the same number of volumizing hoppers 70 as there are compartments 52 in the charging cassette 20. In the case of a loading device 18 designed to simultaneously load as many as 24 tubes, for instance, the number of compartments 52 in the charging cassette 20 and the number of volumizing hoppers 70 in the volumizing cassette 50 would also be 24.

Figure 15:
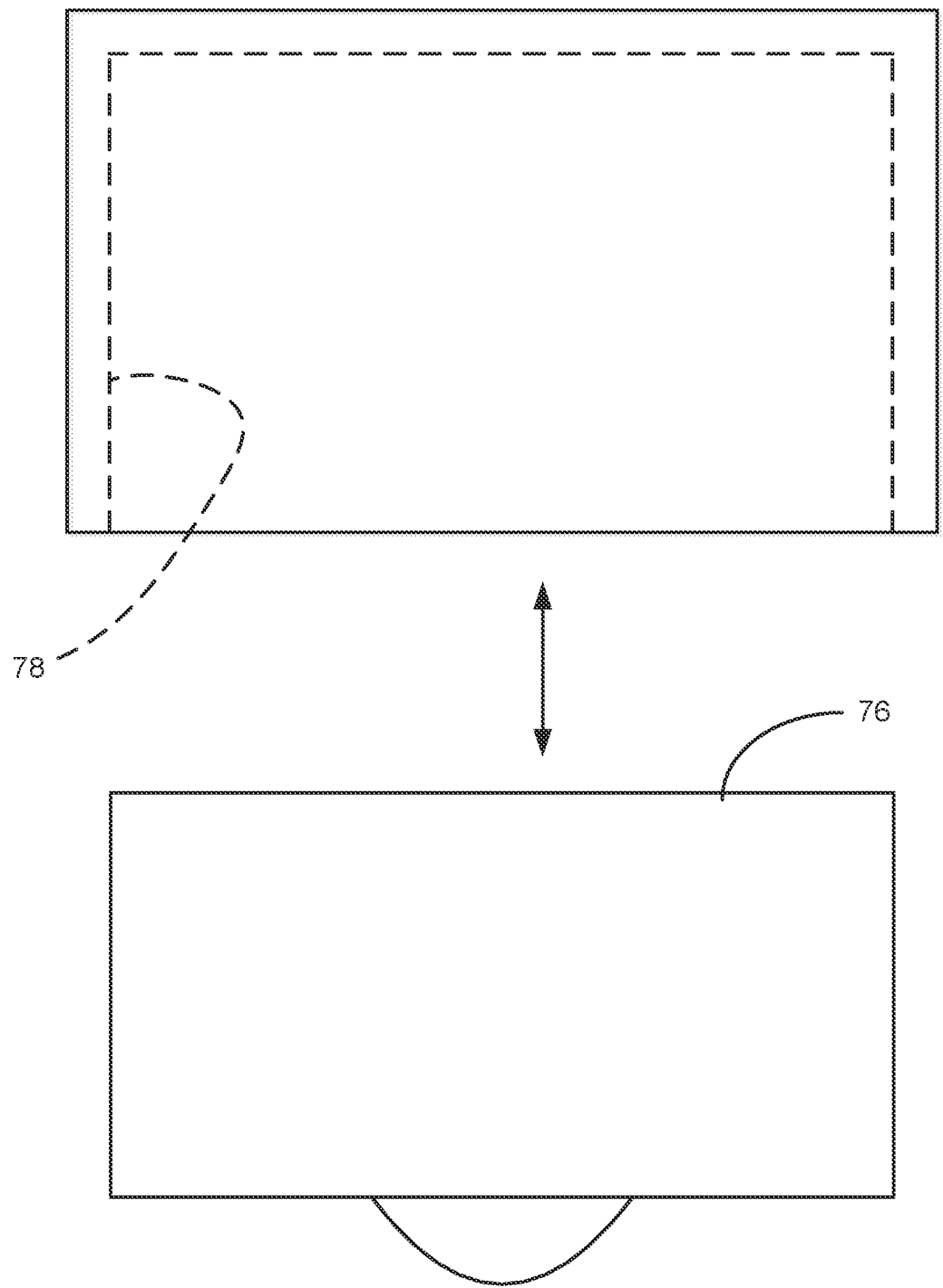
FIG. 15 is an exploded view of the knife gate assembly, which is part of the volumizing cassette of FIGS. 3, 12, and 13.

Referring to FIGS. 12 and 15, the open bottom of the volumizing cassette 50 is closed off by a knife gate 76, which slides into a slotted opening 78 in the bottom plate 80 of the volumizing cassette 50. When the knife gate 76 is inserted into the slotted opening 78, it effectively closes off the bottom openings of the volumizing cassette 50. Once the volumizing cassette 50 is placed atop the charging cassette 20 with the pins 57 of the charging cassette 20 received in the cavities 74 of the volumizing cassette 50, the knife gate 76 is pulled out by the operator, and the pellets in the volumizing hoppers 70 fall into their respective compartments 52 of the charging cassette 20.

Figure 14:
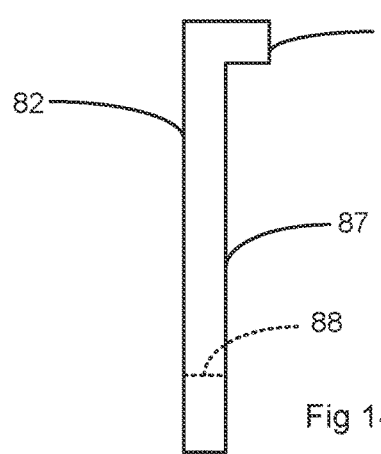
FIG. 14 is a side view of length-adjustable displacement tool to be used with the volumizing cassette of FIGS. 12 and 13.

FIG. 14 shows a length-adjustable displacement tool 82 which can be used to adjust the size of the volumizing hoppers 70. The displacement tool 82 has an inverted "L"-shape so that the upper, short leg 84 may rest atop the top surface 86 of the volumizing cassette 50 (as shown in FIG. 13). The long leg 87 of the displacement tool 82 may be cut off (or broken off, if need be) to a desired length, such as at the dotted line 88, so that this leg 87 of the displacement tool 82 may displace as much (or as little) volume as needed to arrive at a desired effective volume in the volumizing hopper 70. Of course, the cross-section of the displacement tool 82 also may be manufactured to any desired dimension, which allows the user to change the effective volume of the hoppers 70 across a wide range by choosing different dimensions of the displacement tool 82.

The effective volume of the hoppers 70 is selected to hold the desired volume of pellets in order to fill the reactor tube 16 to the desired level.

FIGS. 17-20 show a fixture 90 to help the operator load the volumizing hoppers 70 of the volumizing cassette 50 while gently catching and handling excess pellets. The fixture 90 is an open top box 92 with a pedestal 94 inside the box 92. The pedestal 94 is not quite as tall as the box 92.

Figure 19:
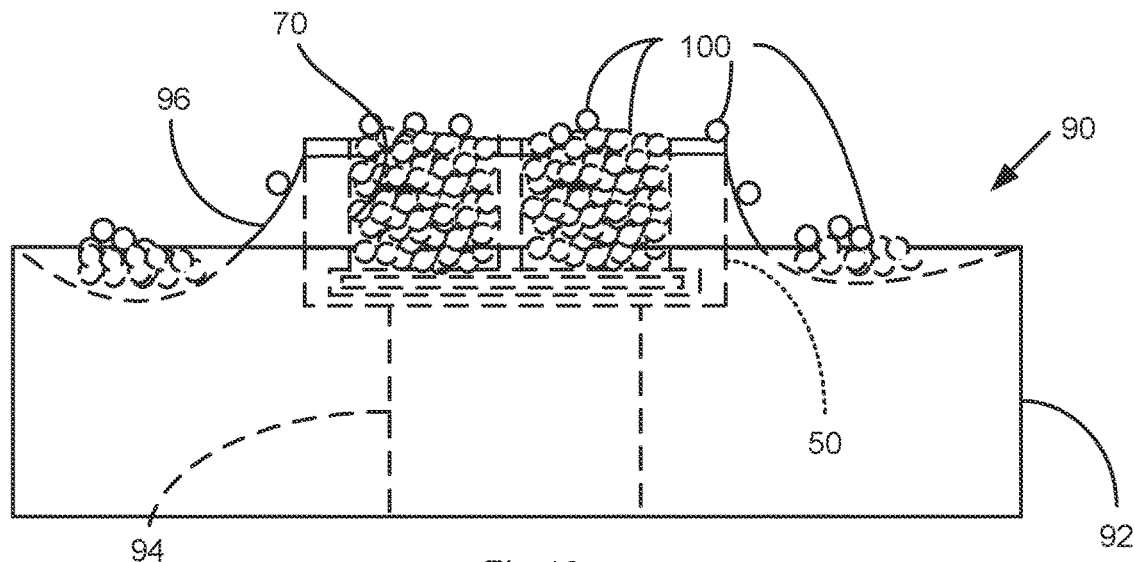
FIG. 19 is a side view of the jig of FIG. 17, being used to load the volumizing cassette of FIGS. 3, 12 and 13.

The operator places the volumizing cassette 50 atop the pedestal 94 with a sheet 96 covering the cassette 50 and covering the open top of the box 92. The top of the cassette 50 is above the top of the box 92. One or more openings 98 in the sheet 96 aligns with the volumizing hoppers 70. (See FIGS. 18 and 19.) The sheet 96 preferably is made of a stretch material. The operator pours pellets 100 onto the sheet 96 and brushes the pellets 100 through the opening(s) 98 into the hoppers 70 until the hoppers 70 are full. Any overflowing pellets 100 are gently caught in the sagging fabric 96, as shown in FIG. 19, where they can be brushed or otherwise moved to incorporate them back into the supply of pellets. Once the cassette 50 has been filled with the desired volume of pellets, it can be used to load a charging cassette 20.

Use of the Pellet Loading Device

To use the pellet loading device 18 described above, the user places the loading device 18 on the top surface of the upper tubesheet 12 and uses the locating pins 46 (See FIG. 3) to properly align the device 18 with the tubes 16 to be filled with pellets. The device 18 will have been set up prior to the initial use so that the conduits 38 and the funnel extensions 44 will lead directly to the tubes 16 to be filled. If the device 18 is unable to rest level atop the tubesheet 12 due to a bump or other discontinuity on the tubesheet 12, the user may rotate the rods 30 to raise the bottom plate 36 until the bottom plate 36 is above any obstructions. If the bottom plate 36 is raised too much, it may be necessary to replace the funnel extensions 44 with longer funnel extensions 44 so that the funnel extensions 44 extend into the tops of the tubes 16.

Once the loading device 18 is set up on top of the tube sheet 12, the required utilities are hooked up. The vibrator 62 and the actuator 26 preferably use electricity, in which the electrical supply would be hooked up at this point. One or both of them alternatively could operate using compressed air, so, in that case, the compressed air would be hooked up at this point. The charging cassette 20 is installed atop the reciprocating plate 22, with the pins 54 of the reciprocating plate 22 being received in the cavities 56 of the charging cassette 20. The volumizing cassette 50, which has already been filled with pellets using the fixture 90, as described above, is placed atop the charging cassette 20 with the pins 57 of the charging cassette 20 being received in the cavities 74 of the volumizing cassette 50. The knife gate 76 of the volumizing cassette 50 then is removed so that the pellets are released into the charging cassette 20 and, once the pellets have fallen into the charging cassette 20, the volumizing cassette 50 is removed and is taken back to the fixture 90 to be reloaded with pellets.

The utilities now are started so that the reciprocating plate 22 and the vibrator 62 are actuated. The pellets are metered from the charging cassette 20 via the reciprocating plate 22, down the conduits 38, through the funnels 44, and into the tubes 16. Once the pellets have all been metered out of the charging cassette 20, the user inspects the tubes 16 to ensure that they are all filled, within the allowable tolerance, to the desired level. If the tubes 16 are filled to a higher level than desired, the user may vacuum out pellets until the desired level is reached. If the tubes 16 are not filled enough, the user can add pellets until the desired level is reached. If an adjustment to the volumes of the hoppers 70 of the loading cassette 50 appears to be needed based on the initial loading, the user can adjust those volumes.

Figure 16:
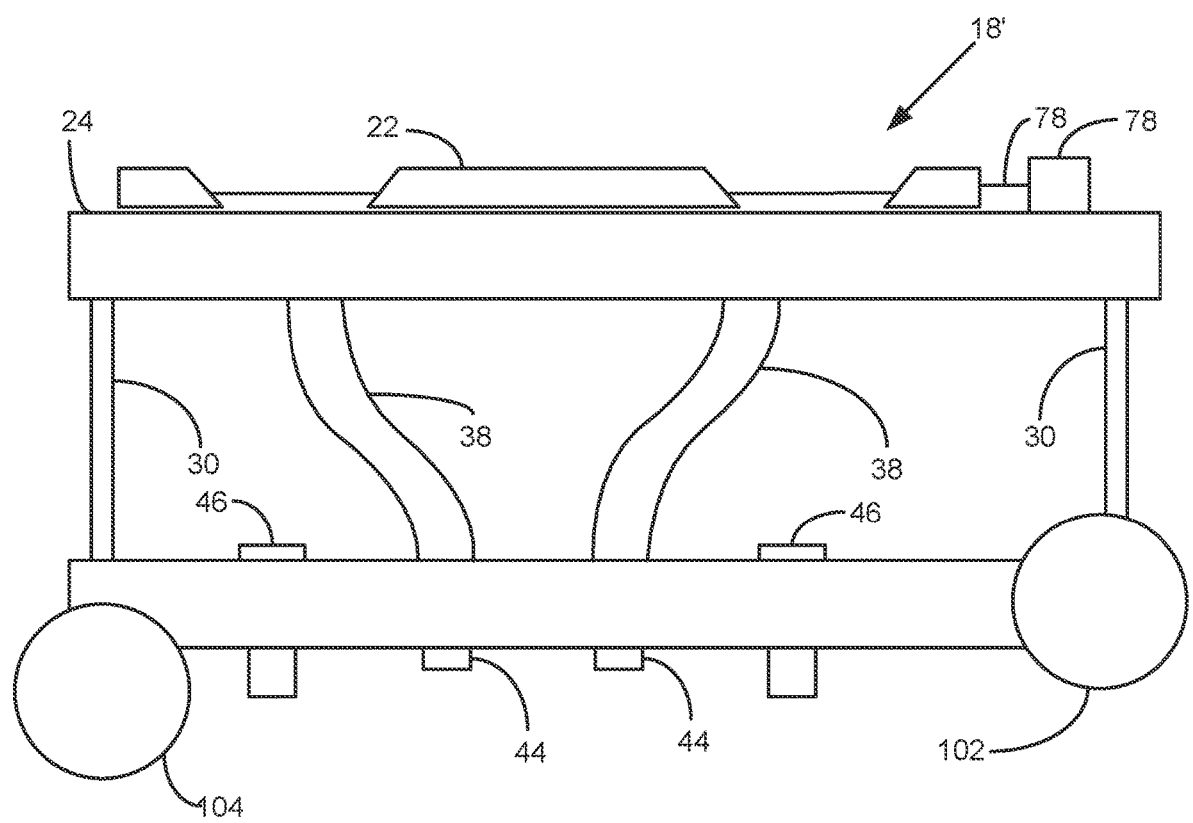
FIG. 16 is a side view of an alternate embodiment of a loading device, having eccentrically mounted wheels, with one wheel in its extended position and the other wheel in its retracted position.
Figure 17:
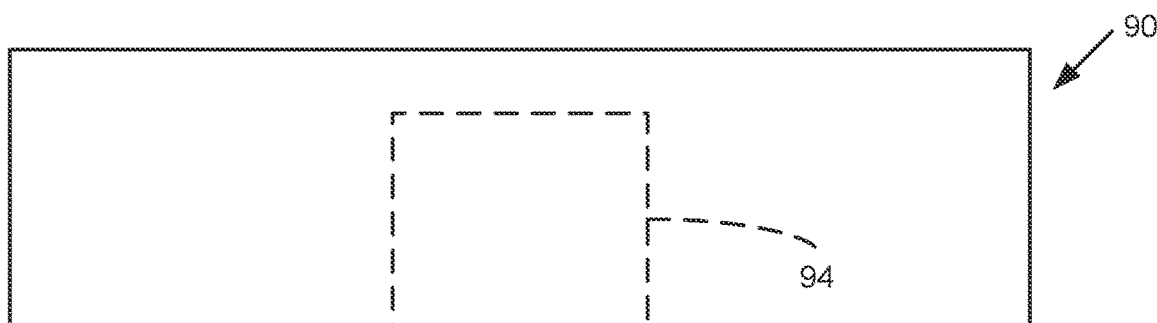
FIG. 17 is a side view of a jig for loading the volumizing cassette of FIGS. 12 and 13.
Figure 18:
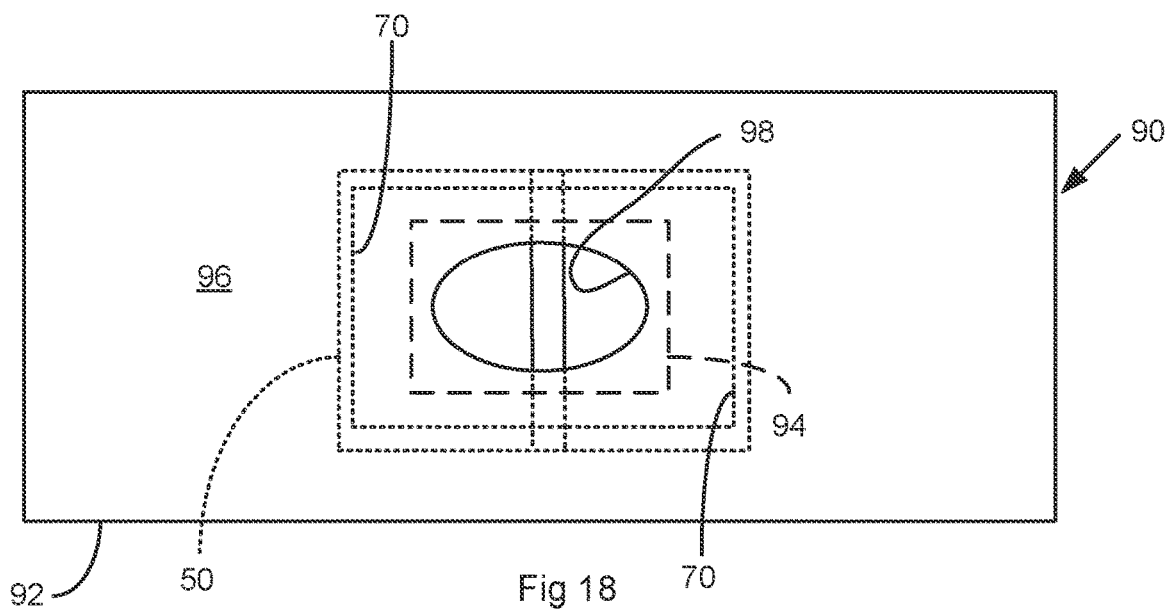
FIG. 18 is a plan view of the jig of FIG. 17 being used to load the volumizing cassette of FIGS. 3, 12 and 13.

The loading device 18 now may be moved to the next set of tubes to be filled. FIG. 16 shows an alternative loading device 18', which is very similar to the device 18 of FIG. 4, except that it has a set of retractable or eccentrically-mounted wheels to make it easier to move the loading device 18'. One of the wheels 102 is shown in the retracted position, which is the position all the wheels would be in when the device 18' is loading pellets into the tubes. The other wheel 104 is shown in the extended position, which is the position all the wheels would be in when the device 18' is being moved to a new location to load a new set of tubes.

It will be obvious to those skilled in the art that modifications may be made to the embodiments described above without departing from the scope of the invention as claimed.

What is claimed is:

1. A portable pellet loading device for loading pellets into the tubes of a chemical reactor having a top tube sheet and a plurality of reactor tubes extending downwardly from the top tube sheet, the portable pellet loading device comprising:
   a plurality of feet defining bottom surfaces at a first elevation;
   a bottom plate supported on said plurality of feet at a second elevation above said first elevation, such that, when the bottom surfaces of said feet are resting on a tube sheet, said bottom plate is spaced above the tube sheet, said bottom plate defining a plurality of bottom plate openings arranged to lie above the reactor tubes;

a plurality of spacers secured to and extending above said bottom plate;

a top plate supported on said spacers at a third elevation, above said second elevation, such that said top plate is spaced above said bottom plate, wherein said top plate defines a plurality of top plate openings corresponding to said bottom plate openings;

a plurality of tubes, each of said tubes extending from one of said top plate openings to a corresponding one of said bottom plate openings; and a plurality of extension tubes extending from said bottom plate openings to said first elevation, such that a pellet can pass through one of said top plate openings, through the respective tube extending from said one top plate opening to said respective bottom plate opening, through said respective bottom plate opening, and through a respective one of said extension tubes to said first elevation.

2. A portable pellet loading device for loading pellets into the tubes of a chemical reactor as recited in claim 1, wherein said feet and said spacers are formed by rods, each of said rods having a bottom end defining said bottom surface and having a threaded outer surface portion which is threaded into a threaded opening in said bottom plate to permit adjustment of said second elevation relative to said first elevation, and wherein said rods extend through said threaded openings in said bottom plate and project above said bottom plate to serve as said spacers, and wherein said rods have top ends that are received in respective recesses in said top plate, with said top plate resting on the top ends of said rods at said third elevation.

3. A portable pellet loading device for loading pellets into the tubes of a chemical reactor as recited in claim 2, and further comprising a reciprocating plate mounted on top of said top plate, said reciprocating plate defining a plurality of reciprocating plate openings corresponding to said top plate openings; a reciprocating actuator connected to said reciprocating plate for moving said reciprocating plate back and forth across said top plate; and a charging cassette resting atop said reciprocating plate for movement with said reciprocating plate, said charging cassette defining a plurality of compartments.

4. A portable pellet loading device for loading pellets into the tubes of a chemical reactor as recited in claim 3, and further comprising a vibrator which vibrates said charging cassette.

5. A portable pellet loading device for loading pellets into the tubes of a chemical reactor as recited in claim 4, wherein the frequency of said reciprocating actuator is adjustable and the frequency of said vibrator is adjustable so the operator can adjust the frequencies of the reciprocating actuator and of the vibrator to establish a desired beat frequency.

6. A portable pellet loading device for loading pellets into the tubes of a chemical reactor as recited in claim 5, wherein said charging cassette has a bottom surface that defines a plurality of recesses, and said reciprocating plate includes a plurality of upwardly projecting pins which are received in said recesses in said charging cassette, and said charging cassette rests on said reciprocating plate and is simply placed onto and lifted off of said reciprocating plate for assembly and disassembly.

7. A portable pellet loading device for loading pellets into the tubes of a chemical reactor as recited in claim 6, and further comprising a volumizing cassette defining a plurality of hoppers corresponding to the compartments in the charging cassette; and a knife gate at the bottom of said volumizing cassette, wherein, when the volumizing cassette is placed on top of the charging cassette with pellets in the hoppers of the volumizing cassette, and the knife gate is opened, the pellets in the volumizing cassette fall from their respective hoppers into respective chambers of the charging cassette below said hoppers.

8. A portable pellet loading device for loading pellets into the tubes of a chemical reactor as recited in claim 7, and further comprising a plurality of displacement tools, which may be inserted into the hoppers to adjust the volume of the hoppers, said displacement tools having an inverted "L"-shape, including a short leg that rests on top of the volumizing cassette and a long leg that extends into the respective hopper.

* * * * *